(12) United States Patent
Nugier

(10) Patent No.: US 6,662,911 B1
(45) Date of Patent: Dec. 16, 2003

(54) BRAKE SHOE RIVET

(76) Inventor: John G. Nugier, 40128 Road 36, Kingsburg, CA (US) 96631

( * ) Notice: Subject to any disclaimer, the term of this patent is extended or adjusted under 35 U.S.C. 154(b) by 0 days.

(21) Appl. No.: 10/289,857

(22) Filed: Nov. 7, 2002

(51) Int. Cl.[7] ............................................. F16D 69/04
(52) U.S. Cl. .................................................. 188/250 G
(58) Field of Search ....................... 188/250 B, 250 G; 411/501

(56) References Cited

U.S. PATENT DOCUMENTS

| | | |
|---|---|---|
| 248,886 A | 11/1881 | Bray |
| 2,237,338 A | 4/1941 | Dale ............................. 85/37 |
| 2,320,862 A | 6/1943 | Goodman ....................... 10/11 |
| 2,366,510 A | 1/1945 | Frank ............................. 85/37 |
| 2,887,694 A | 5/1959 | Sauter ............................ 10/27 |
| 2,991,858 A | 7/1961 | Taylor et al. ................. 189/36 |
| 3,166,769 A | 1/1965 | Wieber .......................... 10/10 |
| 3,505,923 A | 4/1970 | Neill ............................. 85/37 |
| 4,007,540 A | 2/1977 | Tyree ............................ 29/509 |
| 4,051,592 A | 10/1977 | Briles ........................... 29/509 |
| 4,086,839 A | 5/1978 | Briles ............................ 85/37 |
| 4,088,053 A * | 5/1978 | Tyree ............................ 85/37 |
| 4,146,118 A * | 3/1979 | Zankl ....................... 188/250 G |
| 4,159,666 A | 7/1979 | Briles ............................ 85/37 |
| 4,177,545 A | 12/1979 | Lambertz ....................... 29/11 |
| 4,202,243 A | 5/1980 | Leonhardt ...................... 85/37 |
| 5,028,411 A | 7/1991 | Callingham et al. ........... 424/45 |
| 5,088,867 A | 2/1992 | Mun ............................. 411/13 |
| 5,129,771 A | 7/1992 | Briles .......................... 411/507 |
| 5,359,765 A * | 11/1994 | Auriol et al. ............... 29/525.2 |
| 5,478,280 A | 12/1995 | Denham ........................ 470/29 |
| 5,493,833 A | 2/1996 | Irimies ......................... 52/336 |
| 5,671,521 A | 9/1997 | Briles ....................... 29/407.05 |
| 5,680,690 A | 10/1997 | Briles et al. ................... 29/458 |
| 5,738,475 A * | 4/1998 | Chaban ........................ 411/501 |
| 5,868,535 A | 2/1999 | Ladouceur .................... 411/181 |
| 6,142,720 A * | 11/2000 | Edwards ....................... 411/501 |
| 2002/0006321 A1 * | 1/2002 | Singh et al. .................. 411/501 |

* cited by examiner

Primary Examiner—Christopher P. Schwartz
(74) Attorney, Agent, or Firm—Bracewell & Patterson, L.L.P.

(57) ABSTRACT

An improved rivet is provided for joining a friction lining to a brake shoe. The rivet has a cylindrical body with first and second ends. A head is located on the first end of the body, and a hole is formed in the second end of the body. The hole terminates at a base within the body, the hole having a cylindrical surface that is concentric with the body, the base and the cylindrical surface being connected by a circumferential transition region. The hole depth, as measured from the second end of the body, is greater than the outer diameter of the body. In one embodiment, the transition region is a curved surface having a radius greater than one third of the radius of the hole. In another embodiment, the transition region has a conical surface that lies at an angle relative to the cylindrical surface and the base.

20 Claims, 4 Drawing Sheets

Design of conventional truck brake shoe assembly rivet.

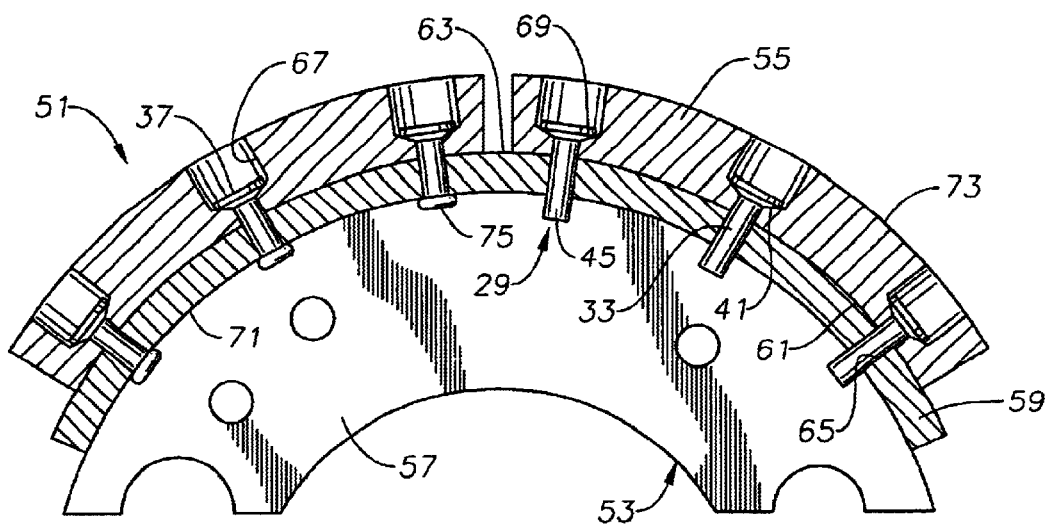
Fig. 5
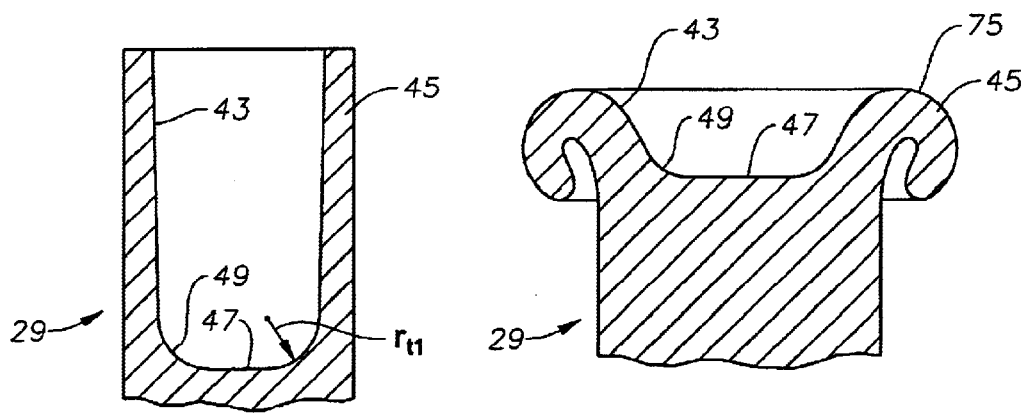
Fig. 6
Fig. 7

BRAKE SHOE RIVET

BACKGROUND OF THE INVENTION

1. Field of the Invention

This invention generally relates to rivets and particularly relates to rivets for attaching brake linings to brake shoes.

2. Description of the Related Art

A brake shoe assembly for drum brakes typically comprises a brake shoe, which has an inner frame having a curved backing plate on the periphery of the frame, and a curved lining of frictional material attached to the outer surface of the backing plate of the shoe. The lining is formed to have an inner radius equal to the outer radius of the backing plate. The friction lining is usually attached by adhesively bonding the lining to the backing plate or by riveting the lining to the backing plate, which is shown generally in FIG. 4. During use, the lining contacts the inner surface of a drum (not shown), the lining acting as a sacrificial wear element. The brake shoe may be rebuilt after use by removing the remaining lining from the shoe and attaching a new lining.

Riveting is often used for high load applications, such as brake shoes for truck brakes, and it is critical to the proper performance of the truck brake that the lining maintains its position relative to the brake shoe during the useful life of the lining. If the lining is not tightly secured to the brake shoe, the lining can shift when the brakes of the truck are applied. This shifting of the lining can cause excessively rapid wear of the lining and/or a complete malfunction of the truck brakes, causing danger to the truck, the operator, and those in the path of the truck.

The current rivet design is based on the 150 Degree Countersunk Head Semi-Tubular Rivet, as specified in the American Society of Mechanical Engineers (ASME) standard B18.7 1972 (R1980), which is shown in FIG. 1. The standard defines a rivet with a cylindrical body having a head at one end and a hole in the end of the body opposite the head. The reference depth K of the hole is approximately equal to the diameter B of the cylindrical body. The inner end of the hole has a conical shape, the included angle being from a maximum of 120 degrees to 180 degrees, which forms a flat inner end.

In the past, a different rivet length was used to secure each lining thickness to the brake shoe so that the depth of the hole in the rivet could be maintained at approximately equal to one body diameter. When the semi-tubular rivet is installed, the rivet is pushed through a hole in the lining and then through the backing plate of the brake shoe. Pressure is applied to the rivet head to keep it tight in the shoe assembly while an installation anvil strikes the exposed tubular end of the rivet, making the walls of the tube roll outwardly and toward the head of the rivet. This shortens the body of the rivet and creates a clamping force between the lining and the shoe. If the inner end, or base, of the hole in the rivet extends beyond the inner surface of the backing plate when the rolling begins, the sidewall of the hole will stop rolling before a clamp force has been created, resulting in loose brake shoe linings.

To overcome this concern, truck brake manufactures have modified the standard rivet design to increase the depth of the hole in the rivet, enabling a rivet of one length to be used to secure linings of various thickness to the brake shoes. FIGS. 2 shows an example of this type of rivet. Rivet 11 has a body 13, one end of the body having a planar head (not shown), the other end of the body having a cylindrical sidewall 15 enclosing a hole 17. Hole 17 has a cylindrical surface 19 that is generally parallel to the outer surface of sidewall 15, cylindrical surface 19 terminating in a base 21. Though shown as being curved and having a large radius, base may be conical, as shown in ASME B18.7. The depth of hole 17 exceeds the diameter of the outer surface of sidewall 15, and the intersection of base 21 with cylindrical surface 19 is at a sharp corner 23.

However, increasing the depth of the rivet's hole has a practical limit. As the depth of the hole progressively increased beyond the diameter of the body, the rivet sidewalls begin to collapse, instead of rolling outward and downward, and/or fracture when the installation anvil applies pressure to the tubular end of the rivet. This is illustrated in FIG. 3, which shows rivet 11 after installation. The right portion of the figure shows sidewall 15 being rolled over, but crack 25 has formed at the intersection with cylindrical surface 19 and base 21. Likewise, the left portion of the figure shows sidewall 15 collapsed, forming fold 27 near the intersection with base 21. When sidewall 15 collapses or develops cracks, the required clamp force is not consistently achieved in all rivets 11 in a truck brake shoe assembly, and loose brake linings can result.

Thus, there is a need for an improved rivet for joining brake linings to brake shoes, in which the depth of the hole in the rivet may be greater than the diameter of the body without collapse or tearing of the sidewalls of the rivet during installation.

SUMMARY OF THE INVENTION

An improved rivet is provided for joining a friction lining to a brake shoe. The rivet has a cylindrical body with first and second ends. A head is located on the first end of the body, and a hole is formed in the second end of the body. The hole terminates at a base within the body, the hole having a cylindrical surface that is concentric with the body, the base and the cylindrical surface being connected by a circumferential transition region. The depth of the hole, as measured from the second end of the body, is greater than the outer diameter of the body. In one embodiment, the transition region is a curved surface having a radius greater than one third of the radius of the hole. In another embodiment, the transition region has a conical surface that lies at an angle relative to the cylindrical surface and the base, the conical surface being connected to the cylindrical surface and the base with curved surfaces.

BRIEF DESCRIPTION OF THE DRAWINGS

The novel features believed to be characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings.

FIG. 5 is a cross-sectional view of a brake shoe assembly, a brake lining being attached to a brake shoe with rivets constructed in accordance with the invention and shown in FIG. 4.

FIG. 6 is an enlarged cross-sectional view of a portion of the rivet of FIG. 4.

FIG. 7 is an enlarged cross-sectional view of the portion of FIG. 6 after installation of the rivet.

DETAILED DESCRIPTION OF THE INVENTION

FIGS. 4 and 6–9 illustrate embodiments of an improved rivet design that overcomes the collapse of the sidewalls in rivets having a hole depth greater than the outer diameter of the body. This is accomplished by changing the shape of the base and/or the intersection of the base and the cylindrical surface of the hole.

Figure 1:
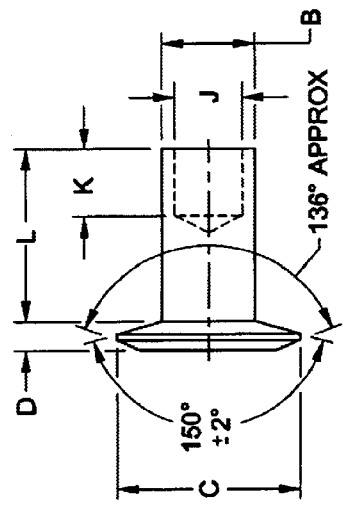
FIG. 1 is an illustration of the ASME standard defining rivets of the prior art.
Figure 2:
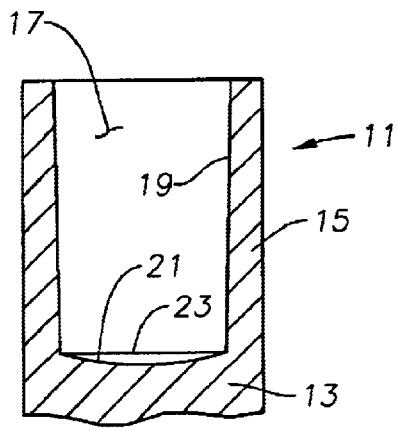
FIG. 2 is a cross-sectional side view of a portion of a prior-art rivet modified from the ASME standard illustrated in FIG. 1.
Figure 3:
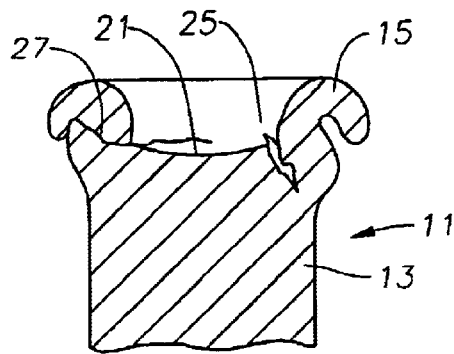
FIG. 3 is a cross-sectional side view of the portion of FIG. 2 after installation of the rivet.
Figure 4:
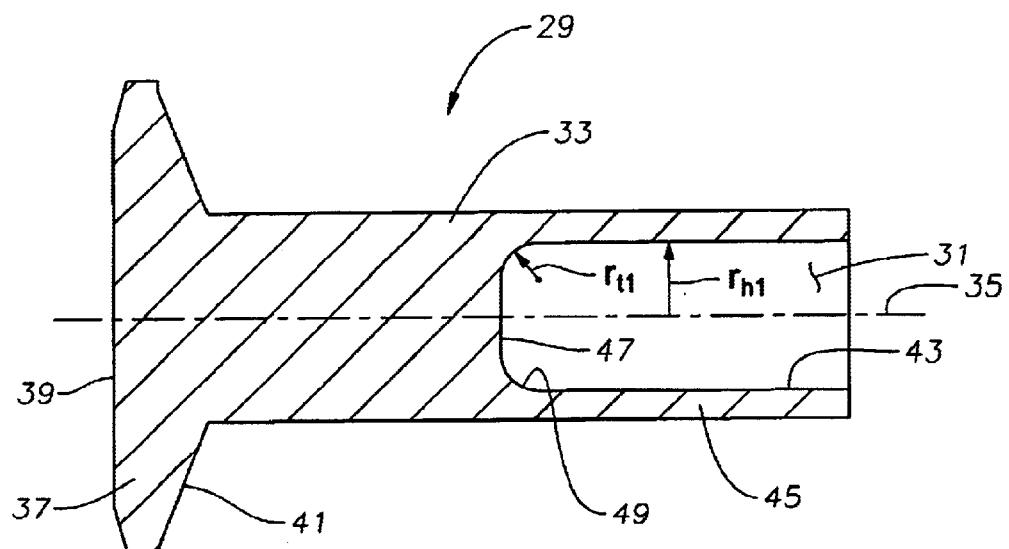
FIG. 4 is a cross-sectional side view of a rivet constructed in accordance with the invention.

FIG. 4 is a cross-sectional view of a rivet 29 based on ASME B18.7, but having a modified hole 31 in body 33. Body 33 is cylindrical and has a central axis 35. A head 37 is located on one end of body 33, and head 37 has an outer surface 39 and an opposing inner surface 41. The diameter of head 37 is larger than that of body 33, allowing inner surface 41 to bear against the area surrounding an installation hole and preventing rivet 29 from being pulled through the installation hole.

Hole 31 is located in the end of body 33 opposite head 37 and has radius $r_{h1}$. Hole 31 is concentric with central axis 35, defining a sidewall 45 with a cylindrical inner surface 43. Hole 31 terminates at its inner end (toward head 37) at a base 47. As shown, base 47 is a flat area generally normal to, and concentric with, central axis 35. Base 47 is connected to cylindrical surface 43 with a circumferential intersecting, or transition, region 49, which is a curved surface having a radius of curvature $r_{t1}$.

Figure 8:
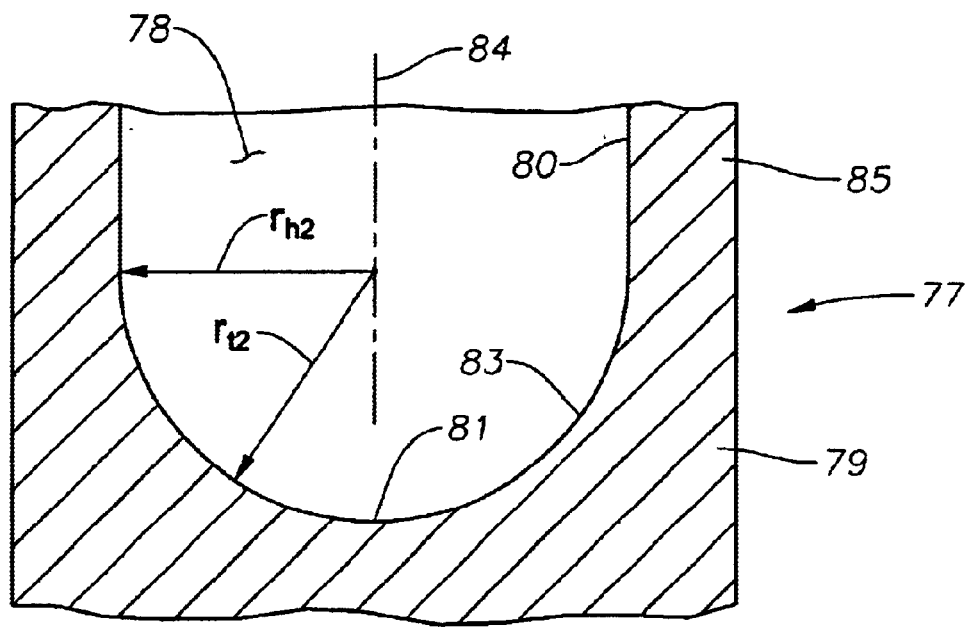
FIG. 8 is an enlarged cross-sectional view of an alternative embodiment of the invention.

Radius $r_{t1}$ is selected to form transition region 49 as tangent to cylindrical surface 43 and base 47 where it meets surface 43 and base 47, with radius $r_{t1}$ being no less than 33% of radius $r_{h1}$ of hole 31 and not greater than the radius $r_{h1}$. If radius $r_{t1}$ is less than radius $r_{h1}$, the center point of radius $r_{t1}$ is located off central axis 35. If radius $r_{t1}$ is equal to radius $r_{h1}$, as shown in FIG. 8 and described below, the center point of radius $r_{t1}$ would be located on axis 35. With a constant radius $r_{t1}$, the distance from base 47 to the point at which transition region 49 joins sidewall 45 is equal to radius $r_{t1}$ and the radial distance inward from sidewall 45 to the point at which transition region 49 joins base 47 is equal to $r_{t1}$.

Region 49 connects cylindrical surface 43 and base 47 with a continuous surface, eliminating discontinuities that become locations for stress risers. In addition, a greater amount of material remains at transition region 49 than if a sharp corner was used. Eliminating the stress risers and providing more material at the junction of base and effectively prevents collapse or tearing of sidewall 45 when rolling sidewall 45 during installation of rivet 29, as shown in FIG. 7, discussed below.

FIG. 5 is a cross-sectional view of a brake shoe assembly 51, comprising brake shoe 53 and brake linings 55. Brake shoe 53 has an inner frame 57 and a curved backing plate 59 attached to the outer edge of frame 57. Each lining 55 is formed from a frictional material, with inner surface 61 having a radius equal to that of outer surface 63 of backing plate 59. Backing plate 59 has a plurality of holes 65 that align with holes 67 in linings 55 when linings 55 are located on backing plate 59, as shown. An inner portion of each hole 67 has a radius approximately equal to that of holes 65, the radius being slightly larger than the radius of body 33 of rivet 29 for receiving body 33. An outer portion of each hole 67 has a larger radius, the radius being slightly larger than the radius of head 37. As rivet 29 is inserted within hole 67, body 33 passes through the inner portion of hole 67, and inner surface 41 of head 37 bears against outward-facing surface 69 of hole 67. A portion of sidewall 45 extends beyond inner surface 71 of backing plate 59, and this portion is rolled by an anvil (not shown) during assembly to join linings 55 to brake shoe 53. Outer surface 39 of head 37 is located below friction surface 73 of lining 55, preventing rivet 29 from contacting the inner surface of the drum (not shown) until a sufficient amount of lining 55 has been worn away during use of brake shoe assembly 51.

During assembly, inner surface 61 of each lining 55, which has a selected thickness that varies with application, is placed against outer surface 63 of backing plate 59, holes 67 of linings 55 being aligned with holes 65 of backing plate 59. Rivets 29 are inserted into holes 67, body 33 extending through the lower portion of each hole 67 and through each hole 65. Inner surface 41 of head 37 abuts outward-facing surface 69 in each hole 67, with outer surface 39 of head 37 being located within the upper portion of hole 67 and below friction surface 73. A portion of sidewall 45 extends beyond inner surface 71, but base 47 (FIG. 4) remains located within hole 65 and does not lie beyond inner surface 71. Pressure is applied to surface 39 of head 37 to retain rivet 29 within holes 65, 67 as an anvil (not shown) contacts and deforms sidewall 45. The anvil rolls sidewall 45 outward and toward head 37, forming rolled head 75 against inner surface 71 of backing plate 59. The lack of stress risers in hole 31 of rivet 29 allows for rolled head to be formed without collapsing sidewall 45 or tearing the material at near base 47. Rivets 29 clamp each lining 55 to backing plate 59, with the clamping force being created by inner surface 41 of head 37 bearing against outward-facing surface 69 of hole 67 and rolled head 75 bearing against inner surface 71.

FIGS. 6 and 7 show rivet 29 before and after, respectively, the anvil (not shown) forms rolled head 75. In FIG. 6, sidewall 45 and cylindrical surface 43 are vertical and approximately perpendicular to the plane of base 47. In FIG. 7, sidewall 45 is deformed into rolled head 75, sidewall 45 being uniformly rolled outward and toward base 47, an upper portion of cylindrical surface 43 forming the periphery of rolled head 75. Transition region 49 is free from tears. The uniform rolling of rolled head 75 and lack of tears in transition region 49 provide for a consistent, high-strength clamping force with rivet 29.

Figure 9:
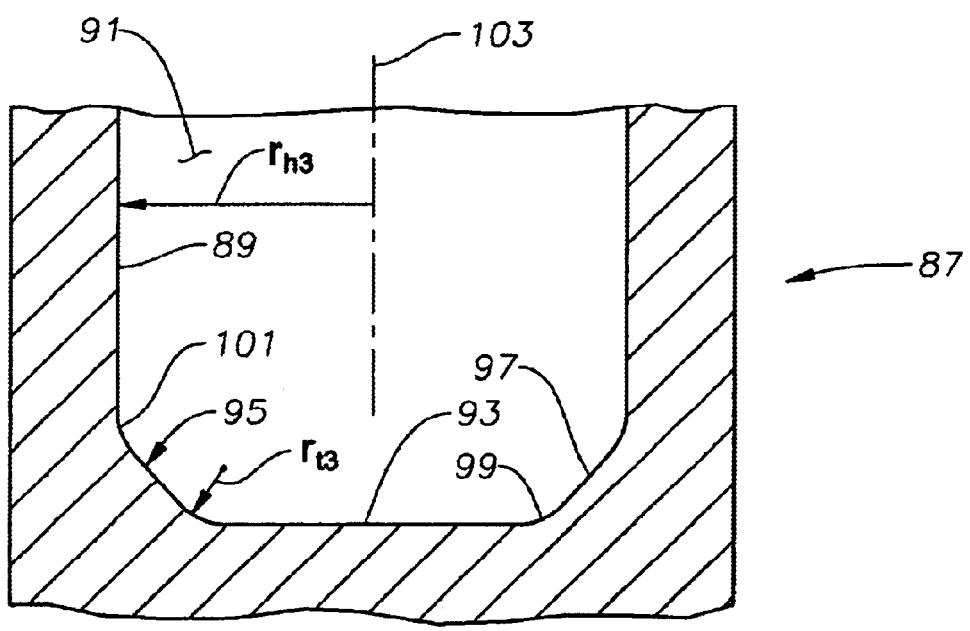
FIG. 9 is an enlarged cross-sectional view of a second alternative embodiment of the invention.

FIGS. 8 and 9 show alternative embodiments of the rivet of the invention. In FIG. 8, rivet 77 has a hole 78 in body 79, hole 78 having radius $r_{h2}$ and defining inner cylindrical surface 80. Cylindrical surface 80 is connected to a curved base 81 by circumferential transition region 83. The radius of curvature $r_{t2}$ of transition region 83 extends from a center of curvature located on central axis 84, base 81 being a distance from the center of curvature equal to radius $r_{t2}$. This forms a hemispherical inner end of hole 78, with base 81 actually being only the center point on axis 84. As in the above embodiment, the radius of curvature of transition region 83 is not greater than the outer radius of body 79. Transition region 83 eliminates locations for stress risers and provides additional material at the intersection of cylindrical surface 80 and base 81, reducing the possibility of sidewall 85 of rivet 77 during installation of rivet 77. Alternatively, the inner end of hole 78 may be elliptical in shape.

FIG. 9 shows a second alternative embodiment of the invention, in which rivet 87 has inner cylindrical surface 89, defining the outer radius $r_{h3}$ of hole 91. Cylindrical surface 89 is connected to a base 93 with circumferential transition region 95. Region 95 comprises a frusto-conical surface 97 and curved surfaces 99, 101, with surface 97 having an inner portion, near base 93, and an outer portion, near the inner end of cylindrical surface 89. Surface 97 is preferably formed to have a cross-sectional angle oriented at approximately 45 degrees relative to the plane of base 93 or to central axis 103. Surface 99 connects base 93 to surface 97 of region 95, whereas surface 101 connects cylindrical surface 89 to surface 97 of region 95. As shown, each of surfaces 99, 101 have a radius of curvature $r_{r3}$, though surfaces 99, 101 may have unequal radii. The radius of curvature $r_{r3}$ is less than radius $r_{h3}$. Each curved surface 99, 101 has one end tangent to cylindrical surface 89 and one end tangent to conical surface 97.

There are several advantages realized through use of the present invention. The rivet designs eliminate rivet sidewall collapse during installation. Also, the designs eliminate the tearing and bulging the sidewall at the base of the hole in the rivet. These advantages provide for a more consistent and reliable attachment of a brake lining to a brake shoe when manufacturing brake shoe assemblies.

While the invention has been shown or described in only some of its forms, it should be apparent to those skilled in the art that it is not so limited, but is susceptible to various changes without departing from the scope of the invention. For example, radius $r_{r1}$ can vary over the cross-sectional length of the transition region, producing an elliptical or otherwise non-circular cross-sectional profile.

I claim:

1. A rivet for joining a friction lining to a brake shoe, the rivet comprising:
   a cylindrical body having first and second ends and an outer radius concentric with a central axis;
   a head located on the first end of the body;
   a hole formed in the second end of the body, the hole terminating at a base within the body and being concentric with the central axis of the body, the hole having a radius, the base and an inner cylindrical sidewall of the hole being connected by a circumferential transition region; wherein
      a depth of the hole, as measured from the second end of the body, is greater than an outer diameter of the body; and
      the transition region is curved and tangent to the sidewall where it joins the sidewall and curved and tangent to the base where it joins the base such that the circumferential transition region is arcuate along the fall extent thereof and such that the base is substantially flat.

2. The rivet of claim 1, wherein:
   the transition region joins the sidewall at a point spaced from the base no less than one-third the radius of the hole.

3. The rivet of claim 1, wherein:
   the transition region joins the base at a radial distance inward from the sidewall that is no less than one-third the radius of the hole.

4. The rivet of claim 1, wherein:
   the transition region joins the sidewall at a point spaced from the base no more than the radius of the hole.

5. The rivet of claim 1, wherein:
   the transition region joins the base at a radial distance inward from the sidewall that is no more than the radius of the hole.

6. The rivet of claim 1, wherein:
   the transition region joins the sidewall at a point spaced from the base no less than one-third the radius of the hole; and
   the transition region joins the base at a radial distance inward from the sidewall that is no less than one-third the radius of the hole.

7. The rivet of claim 1, wherein:
   the transition region joins the sidewall at a point spaced from the base no more than the radius of the hole; and
   the transition region joins the base at a radial distance inward from the sidewall that is no more than the radius of the hole.

8. The rivet of claim 1, wherein:
   the transition region joins the sidewall at a point spaced from tie base no less than one-third the radius of the hole;
   the transition region joins the base at a radial distance inward from the sidewall that is no lees than one-third the radius of the hole;
   the transition region joins the sidewall at a point spaced from the base no more than the radius of the hole; and
   the transition region joins the base at a radial distance inward from the sidewall that is no more than the radius of hole.

9. The rivet of claim 1, wherein:
   the base has a flat central portion, which is concentric with the transition region.

10. The rivet of claim 1, wherein:
    the transition region joins the base at a radial distance inward from the sidewall that is no less than one-third the radius of hole.

11. The rivet of claim 1, wherein:
    the transition region joins the sidewall at a point spaced from the base no more than the radius of the hole.

12. The rivet of claim 1, wherein: the transition region joins the base at a radial distance inward from the sidewall that is no more than the radius of hole.

13. A brake shoe assembly, comprising:
    a brake shoe having an inner frame and a backing plate mounted to a portion of a periphery of the frame;
    a brake lining formed of a frictional material; and
    a plurality of rivets fastening the brake lining to the backing plate; wherein
      each rivet has a cylindrical body with first and second ends and an outer radius, the body having a central axis, a head being located on the first end of the body, and a hole being formed in the second end of the body, the hole terminating at a base within the body and having a cylindrical surface that is concentric with the central axis of the body, the hole having a radius, the base and inner cylindrical surface being connected by a circumferential transition region, a depth of the hole, as measured from the second end of the body, being greater than an outer diameter of the body, and the transition region being curved and tangent to the sidewall where it joins the sidewall and curved and tangent to the base where it joins the base such that the transition region and the base in combination have a substantially hemispherical shape.

14. The brake shoe assembly of claim 13, wherein:

the transition region joins the cylindrical surface at a point spaced from the base no more than the radius of the hole; and the transition region joins the base at a radial distance inward from the cylindrical surface that is no more than the radius of the hole.

15. The brake shoe assembly of claim 13, wherein:

the transition region comprises a conical surface, a curved surface that join the conical surface to the cylindrical surface, and a curved surface that joins the conical surface to the base.

16. The brake shoe assembly of claim 13, wherein:

the base and the transition region are formed at an arc that has a radius equal to the radius of the hole, defining a hemispherical contour.

17. The brake shoe assembly of claim 13 wherein:

the transition region joins the cylindrical surface at a point spaced from the base no less than one-third the radius of the hole; and the transition region joins the base at a radial distance inward from the cylindrical surface that is no less than one-third the radius of the hole.

18. A rivet for joining a fiction lining to a brake shoe, the rivet comprising:

a cylindrical body having first and second ends and an outer radius concentric with a central axis;

a head located on the first end of the body;

a hole formed in the second end of the body, the hole terminating at a base within the body and being concentric with the central axis of the body, the hole having a radius, the base and an inner cylindrical sidewall of the hole being connected by a circumferential transition region, the base having a flat central portion, which is concentric with the transition region; wherein a depth of the hole, as measured from the second end of the body, is greater than an outer diameter of the body;

the transition region is curved and tangent to the sidewall where it joins the sidewall and curved and tangent to the base where it joins the base such that the circumferential transition region is arcuate along the full extent thereof; and, the transition region joins the sidewall at a point spaced from the base no less than one-third the radius of the hole.

19. A rivet for joining a friction lining to a brake shoe, the rivet comprising:

a cylindrical body having first and second ends and an outer radius concentric with a central axis;

a head located on the first end of the body;

a hole formed in the second end of the body, the hole terminating at a base within the body and being concentric with the central axis of the body, the hole having a radius, the base and an inner cylindrical sidewall of the hole being connected by a circumferential transition region; wherein a depth of the hole, as measured from the second end of the body, is greater than an outer diameter of the body; and the transition region is curved and tangent to the sidewall where it joins the sidewall and curved and tangent to the base where it joins the base such that the circumferential transition region includes a first arcuate transition portion positioned adjacent the inner side wall, and a second arcuate transition portion adjacent the substantially flat base.

20. A rivet for joining a friction lining to a brake shoe, the rivet comprising:

a cylindrical body having first and second ends and an outer radius concentric with a central axis;

a head located on the first end of the body;

a hole formed in the second end of the body, the hole terminating at a base within the body and being concentric with the central axis of the body, the hole having a radius, the base and an inner cylindrical sidewall of the hole being connected by a circumferential transition region; wherein a depth of the hole, as measured from the second end of the body, is greater than an outer diameter of the body; and the transition region is curved and tangent to the sidewall where it joins the sidewall and curved and tangent to the base where it joins the base such that the transition region and the base in combination have a substantially hemispherical shape.

* * * * *